(12) United States Patent
Steele

(10) Patent No.: US 6,417,464 B2
(45) Date of Patent: *Jul. 9, 2002

(54) EXTENDED RANGE FEEDERS

(75) Inventor: James R. Steele, Stillwater, MN (US)

(73) Assignee: Dynamic Air, Inc., St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/378,914

(22) Filed: Aug. 23, 1999

(51) Int. Cl.$^7$ .................. G01G 13/18; G01G 13/04; F16K 1/16
(52) U.S. Cl. ............... 177/105; 177/108; 177/119; 177/121; 222/55; 222/290; 222/408; 222/547; 251/301
(58) Field of Search ................. 177/105, 106, 177/107, 108, 109, 110, 111, 112, 113, 119, 120, 121; 222/55, 56, 77, 290, 408, 547, 564; 141/83; 251/301

(56) References Cited

U.S. PATENT DOCUMENTS

| | | | |
|---|---|---|---|
| 2,815,920 A | | 12/1957 | Forman et al. ............... 249/18 |
| 3,777,874 A | * | 12/1973 | Brickhead .................... 198/56 |
| 4,136,804 A | * | 1/1979 | Kinzler et al. ............... 222/547 |
| RE30,993 E | * | 7/1982 | Hopp .......................... 222/631 |
| 4,354,622 A | * | 10/1982 | Wood ........................... 222/55 |
| 4,945,957 A | * | 8/1990 | Kardux et al. ............... 177/120 |
| 4,974,646 A | * | 12/1990 | Martin et al. ................. 141/83 |
| 5,092,490 A | * | 3/1992 | Suzuki et al. ................. 222/56 |
| 5,637,836 A | * | 6/1997 | Nakagawa et al. ......... 177/105 |
| 5,767,455 A | | 6/1998 | Mosher ........................ 177/64 |
| 6,056,025 A | * | 5/2000 | Wegman ....................... 141/67 |
| 6,094,994 A | * | 8/2000 | Satake et al. ................. 222/55 |

FOREIGN PATENT DOCUMENTS

| | | | |
|---|---|---|---|
| DE | 36 37 306 | 5/1987 | ............ A24C/5/32 |
| EP | 0 589 053 A1 | 3/1994 | ............ B65G/53/66 |
| GB | 2 012 438 | 7/1979 | ............ G01G/13/10 |
| GB | 2 114 526 A | 8/1983 | ............ B65G/53/40 |

* cited by examiner

Primary Examiner—Randy W. Gibson
(74) Attorney, Agent, or Firm—Jacobson and Johnson

(57) ABSTRACT

An attachment for a feeder conveyor with the attachment comprising an angularly positionable gate that is angularly positionable within the trough of a feeder with the postionable gate having a secondary metering outlet so that when the postionable gate is in the down position it partially close off the material flow path within the feeder while allowing only a portion of the solid materials in the material flow path to pass therethrough to thereby extend the range at which material can be controllable and uniformly delivered from the feeder.

25 Claims, 4 Drawing Sheets

EXTENDED RANGE FEEDERS

FIELD OF THE INVENTION

This invention relaters generally to material delivery systems and more particularly to a material delivery system for delivering solid materials such as particles, granules or powders over an extended range of material delivery rates.

BACKGROUND OF THE INVENTION

The concept of feeders such as vibratory feeders and gravity feeders are known in the art. In the vibratory feeder, solid material is fed into one end of a horizontal vibrating trough and discharges from the other end as the vibrating action drives the material from one end of the horizontal trough to the other end where the material is discharged. By controlling the amount of vibration applied to the trough and the amount of material delivered to the trough the rate of material fed from the trough can be controlled. Similarly, in an air-activated gravity feeder, where the trough or chute is located at an angle, the solid material flows from the upper end of a chute to the lower end of a chute as air is blown upward through the solid material to fluidize the material. By control of the amount of air supplied to the air-activated gravity feeder and the amount of material delivered to the air-activated gravity feeder the rate of material delivered from the air-activated gravity feeder can be controlled. Both such type of feeders are useful in the handling and delivering of solid materials in measurable rates from one location to another. One of the drawbacks of such systems is that the range of the rate of material delivery for a particular feeder is limited. Typically, prior art feeders can have a "turndown range" of about eight to one. By "turndown range" it is understood to mean the ratio of the maximum amount of material a feeder can deliver at a controlled or uniform rate in relation the minimum amount of material a feeder can deliver at a controlled or uniform rate. For example, with a turndown range of eight to one the maximum amount the system can deliver at a controlled or uniform rate is eight units per minute and the minimum amount of material that the feeder can deliver at a controlled or uniform rate is one unit per minute. While the "turndown range" varies from machine to machine and from material to material a characteristic of such feeders is that the range of the rate of delivery of materials that can be fed is limited as one cannot uniformly throttle down the rate of delivery of solid particles like one can throttle down the flow of fluid with a metering valve. This makes it difficult to use vibratory feeders or air-activated gravity feeders for ladling out materials to weigh scales as uneven flow can cause to much material to be delivered. Consequently, to handle different flow rates at uniform type flow rates multiple feeders having different capacity are often used in the same system in order to obtain the necessary range of rate of delivery of material. The present invention provides an attachment that can increase the "turndown range" from eight to one to one thousand to one while maintaining a substantially uniform material delivery rate. As a result one size feeder can be used in a variety of different applications.

DESCRIPTION OF THE PRIOR ART

U.S. Pat. No. 5,767,455 discloses a typical vibratory feeder for delivering material from one location to another location.

Dynamic Air specification bulletin 9806 discloses an air-activated gravity conveyor that can be built with various size conveying chambers.

SUMMARY OF THE INVENTION

Briefly, the invention comprises an attachment for a air-activated gravity or vibratory feeder with the attachment comprising an angularly postionable gate that is angularly postionable within the trough of a feeder with the postionable gate having a secondary metering outlet so that when the postionable gate is in the down position it partially close off the material flow path within the feeder while allowing a portion of the solid materials in the material flow path to pass therethrough to thereby extend the range of rates at which material can be controllable and uniformly delivered from the feeder.

DESCRIPTION OF THE PREFERRED EMBODIMENT

Figure 1:
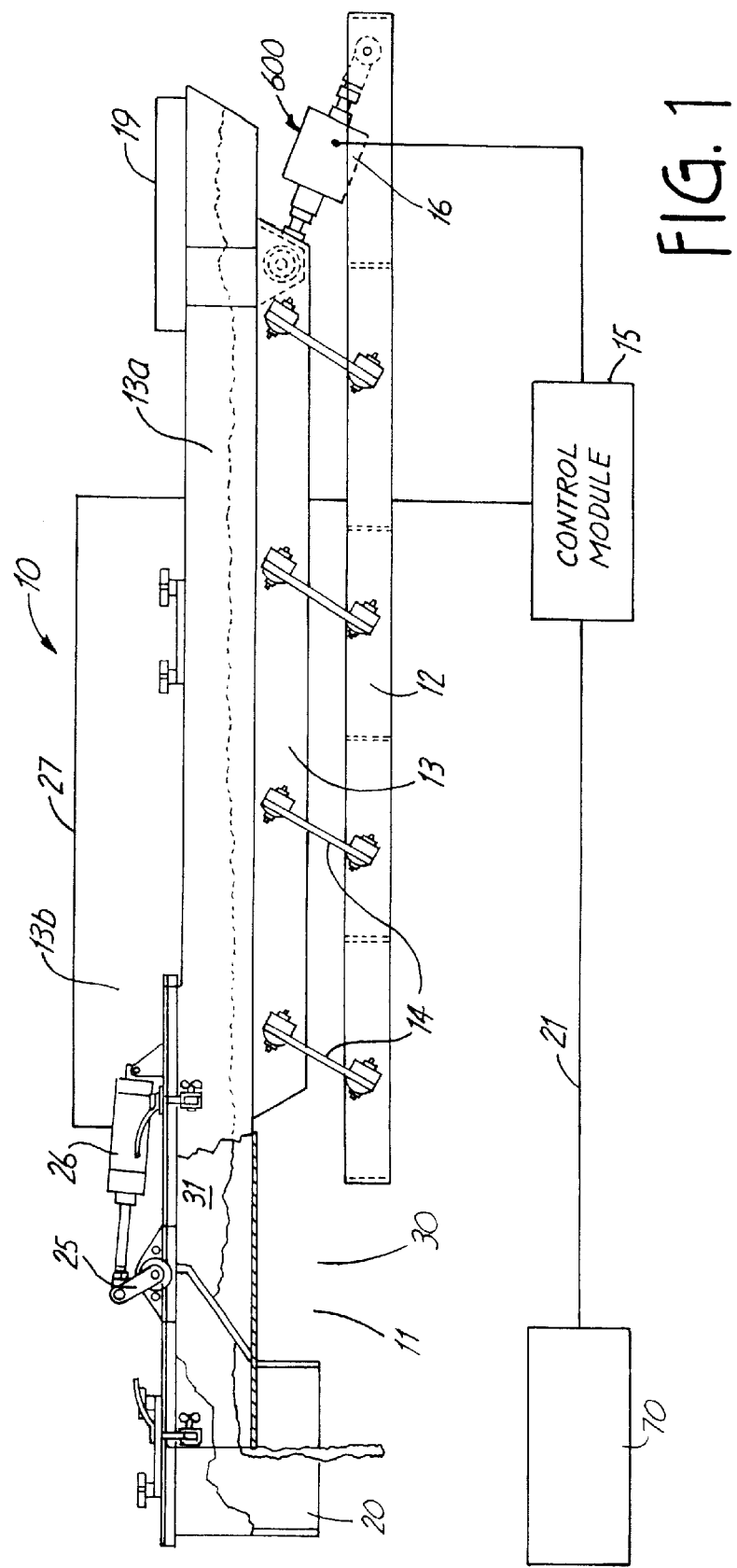
FIG. 1 shows a partial sectional side view of a vibratory feeder containing a postionable gate therein.

FIG. 1 shows a partial sectional side view of a vibratory feeder 10 containing an angularly postionable gate 11 therein. Vibratory feeder includes a base 12 and a housing 13 having a horizontal trough 13a supported by a set of spring plates 14. A control module controls a vibrator drive motor 16 that has one end mounted in base 12 and the other end attached to housing 13. The trough 13a in vibratory feeder comprise a box-like channel with a closed top 13b. Located on one end of trough 13a is an inlet 19 for directing material into trough 13a. Located on the opposite end of trough 13a is an outlet 20 for directing material therefrom. A weigh scale 70 is located below outlet 20 and is connected to control module 15 through lead 71.

Trough 13a includes a material flow path 21 that extends from inlet 19 to outlet 20. In the embodiment shown the postionable gate 11 of the present invention is shown extending into the material flow path 21 to restrict the amount of material flowing through the feeder. Postionable gate 11 is pivotable postionable through a link 25 and a two way power cylinder 26. Power cylinder is controlled by a lead 27 that extends from power cylinder 26 to a control module 15.

In operation of the vibratory feeder of FIG. 1 the motor 16 vibrates the housing 13 thereby causing the material 30 in the horizontal trough 13a to move from the inlet to the outlet through the vibrator action imparted to the trough 13a. In the present invention an angularly-postionable gate 11 has been mounted in trough 13a with the angularly-postionable gate extending into the material flow path 21 within the trough 13a to thereby restrict the amount of solid material 30 flowing into outlet 20. Normally, vibratory feeder includes an unimpeded material flow path 21 therein so that the vibratory action on trough 13a can deliver solid material from the inlet 19 to the outlet 20 by the vibratory action of the material 30 thereon. That is the inertia of the material 30 and the vibratory action of the trough 13a coact such that the trough 13a moves back and forth while the material 30 moves from one end to another along the horizontally positioned trough 13a.

Figure 2:
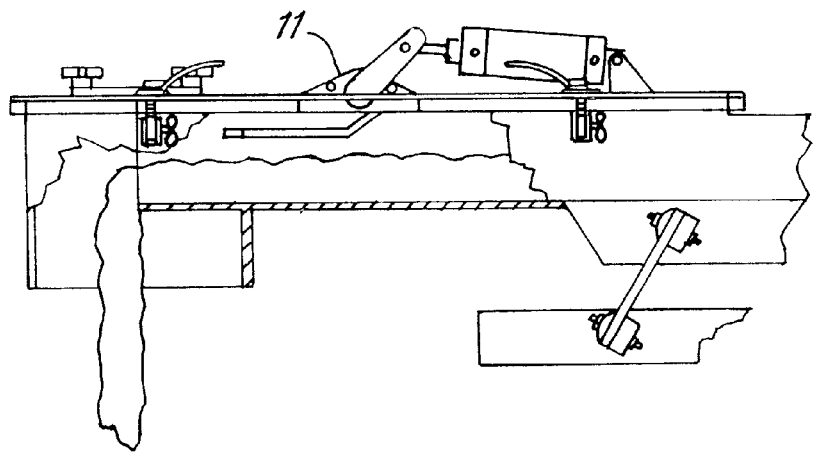
FIG. 2 is a partial sectional vie of a vibratory feeder with the postionable gate in an out of the way condition so that material can be directed through the vibratory feeder at the maximum rate.

In contrast, to the throttled down operation of the vibratory feeder shown in FIG. 1, FIG. 2 is a partial sectional view of a vibratory feeder 10 with the angularly-postionable gate 11 in an out of the way condition so that material can be directed through the vibratory feeder at the maximum rate.

Figure 3:
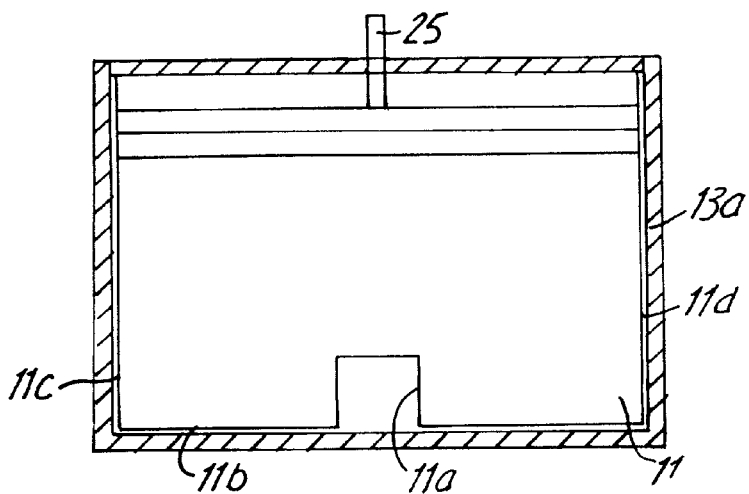
FIG. 3 shows a partial cross sectional view of the vibratory feeder trough with the positionable gate located in the material flow path.

To illustrate the angularly-postionable gate 11 in relation to the trough 13a and the material flow path reference should be made to FIG. 3 which shows a partial cross sectional view of the vibratory feeder trough 13a with the positionable gate 11 located in the material flow path with a secondary metered gate outlet I 1a formed in the bottom portion of angularly-postionable gate 11.

Figure 4:
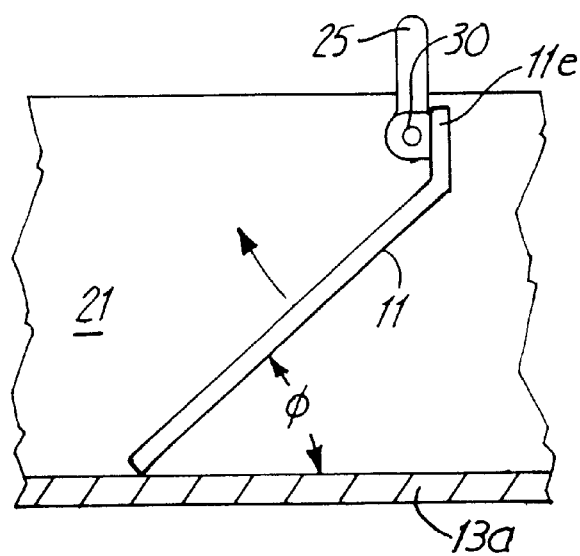
FIG. 4 shows a side view of the vibratory feeder trough and the postionable gate located at an angle ø within the trough of the vibratory feeder of FIG. 1.

FIG. 4 shows a side view of the vibratory feeder trough and the angularly-postionable gate 11 located at an angle ø within the trough of the vibratory feeder of FIG. 1. Angularly-postionable gate comprises a flat plate having a lower edge 11b that can be brought into engagement with the bottom of trough 13a. Angularly-postionable gate 11 has sides 11c and 11d that cooperate with the sides of trough 13a to form an obstruction to flow of material along material flow path 21. FIG. 4 shows that the upper end 11e of angularly-postionable gate 11 is pivotally supported by pivot hinge 30 which is pivotable through link 25.

As can be seen in FIG. 3 the positionable gate 11 substantially closes off the material flow path 21 with the exception of the secondary metered outlet 11a formed in angularly-postionable gate 11. The outlet 11a is shown as being substantially rectangular however other shapes of outlets could be used. The outlet 11a is also located along the bottom portion of gate 11 so that the bottom of the trough 13a can continue to support and form the delivery mechanism for delivering solid material to outlet 20. Even though the materials 30 being delivered by the vibratory feeder 10 are solid materials such as powders, particles, or granular materials which do not readily flow from one location to another is has been found that the partially closing off of the material flow path by positioning a gate with a secondary outlet therein allows material to be controllable delivered at a substantially reduced and uniform rate from the vibratory feeder. Consequently, the "turndown range" of the feeder conveyor can be greatly extended. By being able to extend the turndown range a single feeder conveyor can be used to deliver material at a wide range of delivery rates. That is, the material can be delivered at a controlled and uniform rate whether the material flow path is unimpeded or partially closed off. FIG. 1 illustrates that a buildup of material 30 occurs immediately behind angularly-postionable gate 11 but in spite of the buildup the vibratory action of the vibratory feeder causes a diminished amount of material 30 to be delivered in a uniform band through outlet 20. FIG. 4 indicates by arrow that the angularly postionable gate 11 can be swung from an acute angle ø to the out of the way position as shown in FIG. 2. In the preferred embodiment the angle ø of the angularly-postionable gate ø is maintained at 90° or less and preferably at about 45° or less as it has been found that with many materials the material will not clump but flow uniformly through the secondary outlet in the angularly-postionable gate when the postionable gate is angularly positioned with respect to the bottom of the trough 13a. It should be understood that, the optimum angle ø of the angularly-postionable gate can be determined by the type of solid materials being handled in the feeder system. With some solid materials the angle of the positionable gate may have to be small and in others it may have to be large to prevent clumping and uneven delivery of materials therethrough. The determination of the optimum angle of the angularly-postionable gate for delivery of controlled flow can readily determined by trial and error for a particular solid material by merely observing at which angle the feeder delivers a more uniform band of material 30 therefrom.

With the vibratory feeder 10 of FIG. 1, the rate of material delivered can by decreased by placement of a postionable gate with a secondary outlet in the vibratory feeder. Thus by having different size secondary outlets one can limit the maximum delivery rates. In addition even though the maximum delivery rate is limited by the secondary outlet one can still maintain the proportional control of the delivery rates by controlling the volume of material supplied to the inlet of the vibratory feeder. Further proportional control of the delivery rates can be obtained by controlling the vibratory input to the vibratory feeder. Thus with the present invention the ability to proportionally control the delivery rates of the vibratory feeders is maintained even though the maximum rate of material delivered is limited by use of the postionable gate with the secondary outlet.

Figure 5:
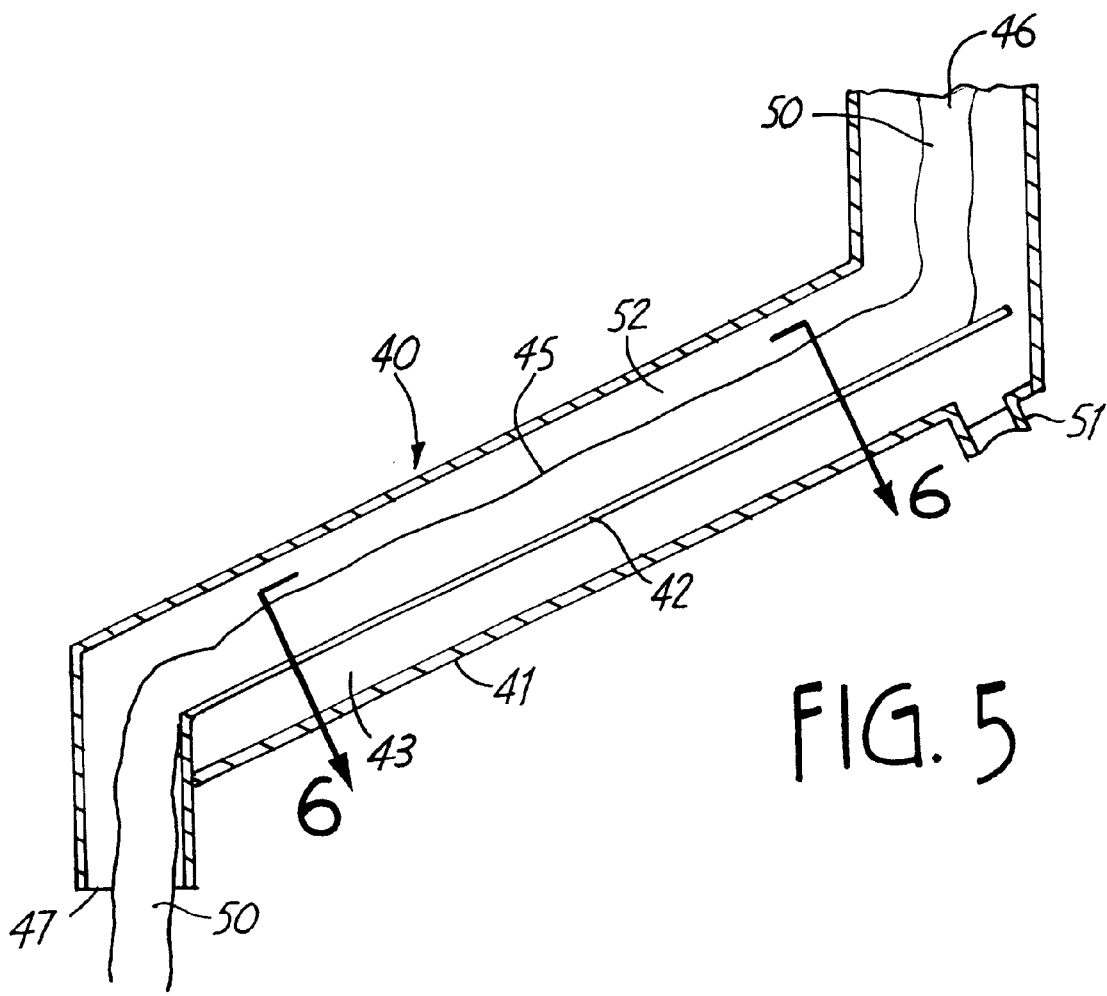
FIG. 5 is a cross sectional view of an air-activated gravity conveyor for delving material from one location to another.

FIG. 5 is a cross sectional view of a gas-activated gravity conveyor 40 for delivering material from one elevation to another elevation. Gas-activated gravity conveyor 40 is normally supplied with air and is referred to as an air-activated gravity conveyor 40 and includes a trough or chute 41 having an inlet 46 and an outlet 47. Located in the bottom of trough 41 is an air inlet 51 for directing air or gas into a plenum chamber 43 which is separated from an upper material flow path 52 by a porous screen 42. In operation of air-activated gravity conveyor 40 material is directed into inlet 46 when if flows onto porous screen 42 where the air from plenum chamber 43 passes therethrough and fluidized material 50 so that the solid particle material can be delivered from the inlet to the outlet.

Figure 6:
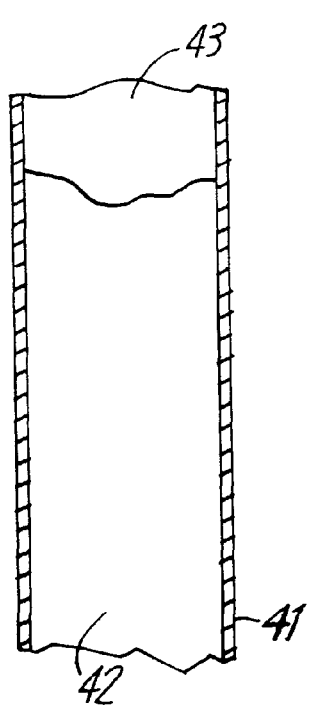
FIG. 6 is cross sectional view of the trough of the air-activated gravity conveyor of FIG. 5 showing the porous screen bed for directing material thereover.

FIG. 6 is a top sectional view taken along lines 6—6 which shows the porous screen 42 mounted in trough 41 with a single plenum chamber 43 located below porous screen 42.

Figure 7:
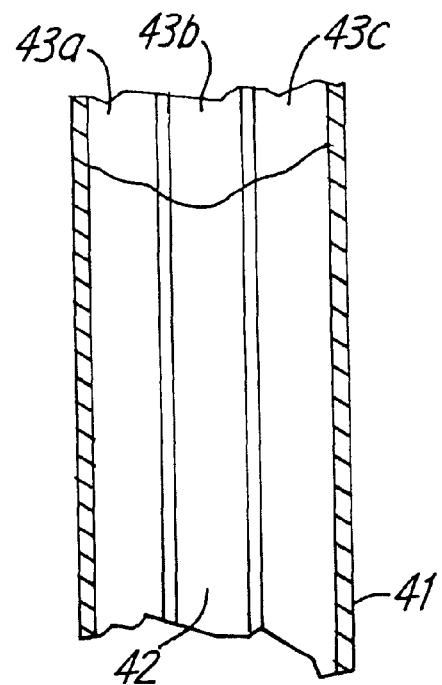
FIG. 7 is a cross sectional view of the trough of the air-activated gravity convey of FIG. 6 with multiple air plenum chambers positioned below the porous screen bed.

FIG. 7 is a cross sectional view of the trough 41 of the air-activated gravity conveyer of FIG. 6 with the trough 41 including multiple parallel air plenum chambers 43a, 43b and 43c positioned along the bottom of trough 41. The use of multiple air plenum chambers allows one to select a smaller fluidized bed. That is, by pressurizing only air plenum chamber 43b the material in the trough that is on top of the portion of screen 42 which is proximate chamber 43b will be fluidized. Similarly, by pressurizing two of the three air plenum chambers a larger fluidized bed can be provided to thereby deliver solid materials at a faster rate. Thus the use of multiple plenum chambers provides a further control of the rate of material delivery by the gravity feeder.

Figure 8:
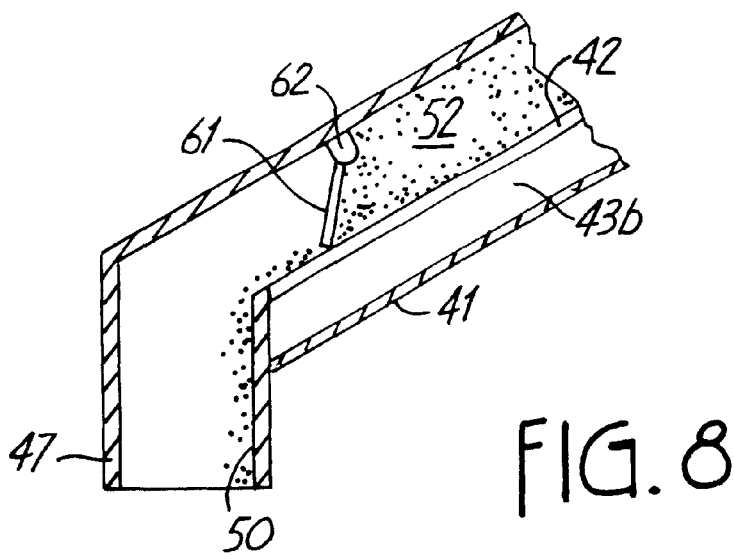
FIG. 8 is a cross sectional view of the trough of the air-activated gravity conveyor of FIG. 5 with a postionable gate located in the material flow path in the air-activated conveyor.

FIG. 8 is a partial cross sectional view of the trough 41 of the air-activated gravity conveyor 40 with an angularly-postionable gate 61 pivotally mounted on a pivot hinge 62. The angularly-postionable gate 61 is shown in the down position so that material 50 can flow along material flow path 52 and tough a secondary metering outlet (not shown) located in the bottom portion of angularly-postionable gate 11. As the secondary metered outlet of gate 61 is identical to the secondary metered outlet 11a of gate 11 it will not be described herein With angularly-postionable gate 61 located in the material flow path in the air-activated conveyor the rate of solid material flowing trough conveyor 40 can be substantially reduced thereby allowing material to be delivered at very low flow rates. In addition the use of multiple gas or air plenum chambers allows one to both reduce the amount of fluidizing material as well as to controllable and uniformly deliver a controlled amount of material.

Figure 9:
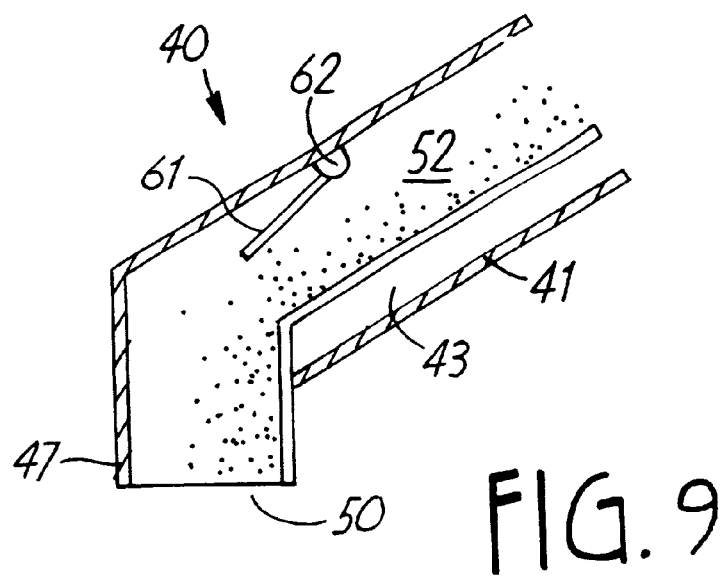
FIG. 9 is a cross of the trough of FIG. 5 with the postionable gate located in an open condition to allow flow of material within the material flow path of the air-activated conveyor.

FIG. 9 is a partial cross sectional view of the trough of the air-activated gravity conveyor 40 with a angularly-postionable gate 61 pivotally mounted on pivot hinge 62. The angularly-postionable gate 61 is shown in the out-of-the way position so that material 50 can flow unimpeded along material flow path 52. Thus with the present invention it is possible to uniformly control the rate of delivery of solid materials at the desired rate by placing an angularly-postionable gate with a secondary outlet gate in the material feeder path. Consequently, those applications where either large amounts of solid materials or small amounts of solid material must be weighed out quickly can be achieved with a single embodiment of present invention as the rates of flow of materials therethrough can be controlled in a uniform manner.

The angularly postionable gate of the present invention not only provides for uniform delivery solid materials therethrough but if the materials should accidentally clump up and block the opening the postionable gate can be quickly swung out of the way to allow the clump to pass through. Once the clump has passed through the postionable gate can be quickly swung into the metering position.

With the feeder 40 of FIG. 5, the rate of material delivery can by decreased by placement of a postionable gate with a secondary outlet in the gravity feeder. Thus by having different size secondary outlets one can limit the maximum delivery rates. In addition, further control of the delivery rates can be obtained by decreasing the size, number or shape of the plenum chambers. For example, a single plenum chamber such as chamber 43b can be used to fluidize the material which would limit the amount of material that could flow down the gravity feeder. Even though the maximum delivery rates are limited by the secondary outlet of the present invention, one can still maintain the proportional control of the delivery rates by controlling the volume of material supplied to the inlet of the gravity feeder. Further proportional control of the delivery rates can be obtained by controlling the pressure of the air supplied to the gravity feeder. Thus with the present invention the ability to proportionally control the delivery rates of the gravity feeders is maintained even though the rate of material delivery is limited by use of the postionable gate with the secondary outlet.

Thus with the present invention a member such as an air source for increasing or decreasing the air under pressure to further control the rate of material delivery from said feeder. In addition the present invention including a further member such as a valve for increasing or decreasing the pressure of the air to further control the rate of material from said feeder. As a further control of the material delivery rate the present can include a plurality of chambers of different size to further control the rate of material delivery by selecting the size of the plenum chamber.

I claim:
1. A feeder for delivering material:
   a housing, said housing have an inlet and an outlet;
   a trough located in said housing with said trough extending between said inlet and said outlet and defining a material path therethrough;
   a source of energy for powering said feeder to enable material delivered to the inlet to be directed from said outlet; and
   a gate, said gate mounted in said housing, said gate including a fixed size outlet, said gate with said fixed size outlet positionable within said trough, said gate pivotally mounted for positioning in the material flow path to control the size of the material path therethrough to thereby extend the range of uniform delivery rate of material delivered from said feeder.
2. The feeder of claim 1 wherein the feeder comprises a vibratory feeder.
3. The feeder of claim 1 wherein the gate is pivotally mounted for positioning in the material flow path.
4. The feeder of claim 1 wherein the feeder comprises an air-activated gravity feeder.
5. A feeder for delivering material:
   a housing, said housing have an inlet and an outlet;
   a trough located in said housing with said trough extending between said inlet and said outlet and defining a material path therethrough;
   a source of energy for powering said feeder to enable material delivered to the inlet to be directed from said outlet; and
   an angularly-positionable gate, said angularly-positionable gate mounted in said housing, said angularly-positionable gate including a secondary fixed size outlet located in a bottom section of the angularly-positionable gate, said gate with said fixed size outlet positionable within said trough to control the size of the material path therethrough to thereby extend the range of uniform delivery rate of material delivered from said feeder.
6. The feeder of claim 5 wherein the feeder includes multiple plenum chambers for fluidizing material therein.
7. The feeder of claim 6 wherein only one of the multiple plenum chambers is used for fluidizing solid material thereon.
8. The feeder of claim 1 wherein a two way power cylinder connects to said gate to thereby position said gate with fixed size outlet in the material flow path therein to at least partially block off the material flow path therein.
9. The feeder of claim 8 including a control module for controlling the two way power cylinder.
10. A feeder for delivering material:
    a housing, said housing have an inlet and an outlet;
    a trough located in said housing with said trough extending between said inlet and said outlet and defining a material path therethrough;
    a base for vibratingly supporting said trough thereon;
    a source of energy for powering said feeder to enable material delivered to the inlet to be directed from said outlet;

a gate, said gate mounted in said housing, said gate including a fixed size outlet, said gate with said fixed size outlet positionable within said trough to control the size of the material path therethrough to thereby extend the range of uniform delivery rate of material delivered from said feeder;

a two way power cylinder, said two way power cylinder connected to said gate to thereby position said gate with said fixed size outlet in the material flow path therein to at least partially block off the material flow path therein; and a control module for controlling the two way power cylinder.

11. The feeder of claim 10 including a weigh scale for weighing the material deliver thereto.

12. A method of extending the range of solid material delivery while maintaining uniform delivery rates comprising:

directing solid materials laterally into an inlet in a trough;

directing solid materials along a material flow path in the trough;

moving an angularly positionable gate having a secondary outlet of a fixed size located in a bottom section of the angularly-positionable gate into the material flow path to reduce the size of the flow path therein to thereby extend the range of uniform delivery of solid materials.

13. The method of claim 12 including the step of positioning the positionable gate at an acute angle with respect to the trough.

14. The method of claim 13 including the step of pivoting the positionable gate into position to reduce the size of flow path.

15. The method of claim 14 including the step of vibrating the trough to direct the particles along the flow path.

16. The method of claim 12 including the step of directing air through one of a plurality of plenum chambers to fluidize the materials and further decrease the flow path.

17. The method of claim 16 including the step of varying the pressure of air through the one of the plurality of plenum chambers to further control the delivery of materials therefrom.

18. The method of claim 16 including the step of varying the volume of air through one of the plurality of plenum chambers to further control the delivery of materials therefrom.

19. The method of claim 16 including the step of varying the number of plenum chambers that air is supplied therein to further control the delivery of materials therefrom.

20. A feeder for delivering material:

a housing, said housing have an inlet and an outlet;

a trough located in said housing with said trough extending between said inlet and said outlet and defining a material path therethrough;

a plurality of chambers in said housing;

a source of energy for delivering air under pressure to at least one of the plurality of chambers to control the material delivery rate; and an angularly-positionable gate, said angularly-positionable gate mounted in said housing, said angularly-positionable gate including a secondary fixed size outlet located in a bottom section of the angularly-positionable gate, said angularly-positionable gate with said fixed size outlet positionable within said trough to control the size of the material path therethrough to thereby extend the range of uniform delivery rate of material delivered from said feeder.

21. The feeder of claim 20 including a member for increasing or decreasing the air under pressure to further control the rate of material delivery from said feeder.

22. The feeder of claim 20 including a further member for increasing or decreasing the pressure of the air to further control the rate of material from said feeder.

23. The feeder of claim 20 including having the plurality of chambers of different size to further control the rate of material delivery by selecting the size of the plenum chamber.

24. The method of claim 12 wherein the step of moving an angularly positionable gate having a secondary outlet of a fixed size located in a bottom section of the angularly-positionable gate into the material flow path to reduce the size of the flow path therein to thereby extend the range of uniform delivery of solid materials comprises pivotally moving an angularly positionable gate having a secondary outlet of a fixed size located in a bottom section of the angularly-positionable gate into the material flow path to reduce the size of the flow path therein to thereby extend the range of uniform delivery of solid materials.

25. The method of claim 12 wherein the step of moving an angularly positionable gate having a secondary outlet of a fixed size located in a bottom section of the angularly-positionable gate into the material flow path to reduce the size of the flow path therein to thereby extend the range of uniform delivery of solid materials comprises moving an angularly positionable gate having a secondary outlet of a fixed size located in a bottom section of the angularly-positionable gate into the material flow path to reduce the size of the flow path therein to thereby extend the range of uniform delivery of solid materials and swinging the angularly positionable gate to an out of the way position when solid materials accidentally form a clump and block off the flow of material therethrough to thereby allow the clump to pass under the angularly positionable gate.

* * * * *